Patented Jan. 4, 1949

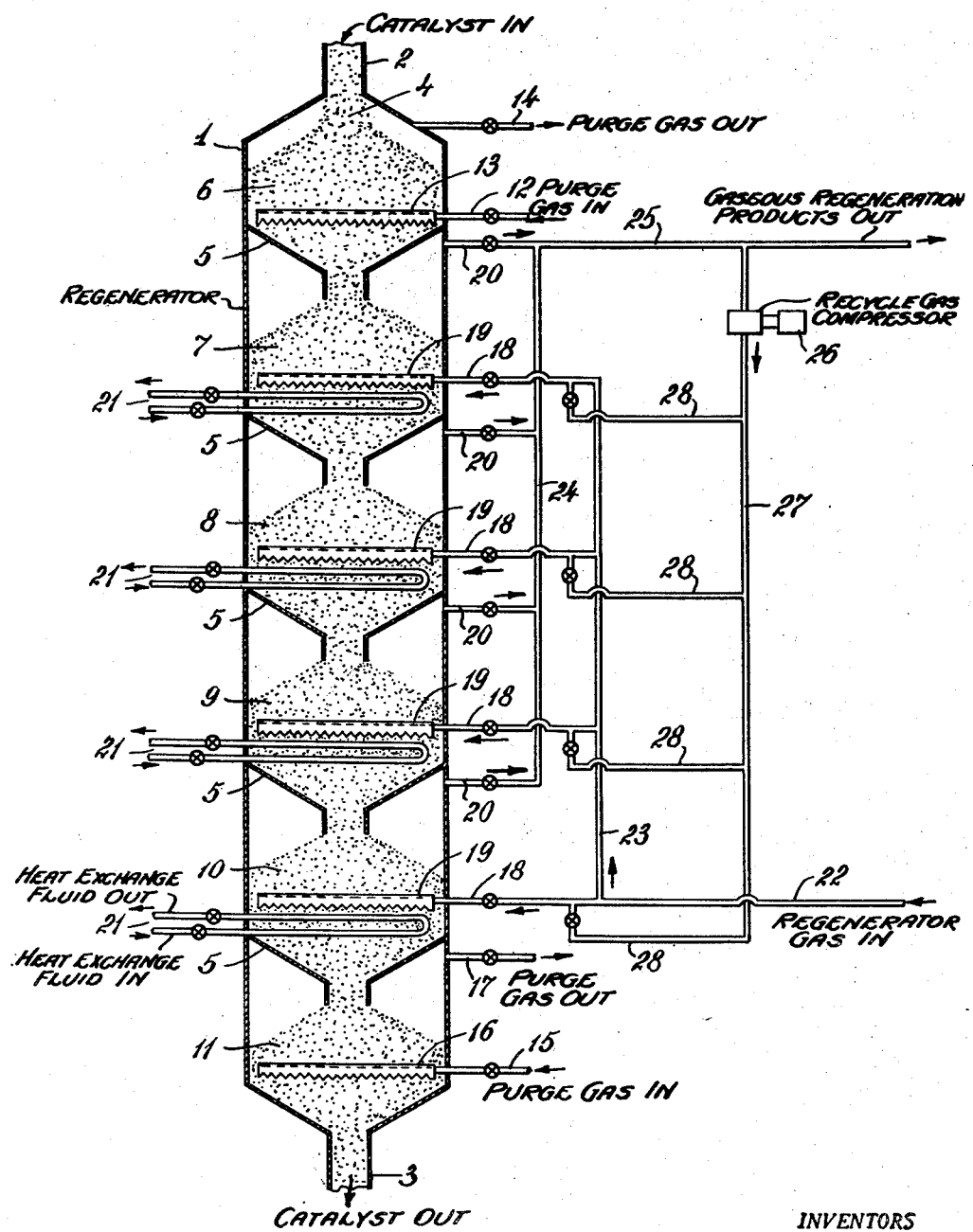

2,457,837

UNITED STATES PATENT OFFICE

2,457,837

MULTISTAGE REGENERATION OF A MOVING BED CATALYST

Thomas P. Simpson, Woodbury, and Charles V. Hornberg, Wenonah, N. J., assignors to Socony-Vacuum Oil Company, Incorporated, a corporation of New York Application May 21, 1943, Serial No. 487,900

2 Claims. (Cl. 252—242)

This invention has to do with the regeneration of particle form solid adsorptive material which has become contaminated with combustible carbonaceous material while being used as, for example, an adsorptive in the filtration of petroleum lubricant fractions to improve its character or as a catalytic contact mass material in the catalytic conversion of hydrocarbon materials. It is well known that solid adsorptive materials such as, for example, certain associations of alumina and silica exert a catalytic action toward various hydrocarbon conversions, for example, in the conversion of materials of gas oil nature to materials of gasoline nature. Such solid adsorptive materials are also used in other conversions, such as aromatization, alkylation, dealkylation, dehydrogenation, reforming and other conversion operations. Of all such operations, the conversion of gas oil to gasoline is typical and will be used herein as exemplary. It is well known that when vapors of a gas oil boiling, for example, between about 400°–500° F. and about 700°–750° F., are heated to temperatures of the order of 800°–1000° F., and passed through a contact mass consisting of particles of clay-like nature, such as certain natural or synthetic clays, that a substantial conversion of the gas oil to gasoline is experienced and that this conversion is accompanied by a deposition on the contact mass particles of a combustible carbonaceous deposit generally referred to as coke and that as the deposit increases in amount, the activity of the catalyst decreases to the point requiring regeneration before the use of the catalyst in the reaction can be continued. The conventional method of effecting regeneration of such catalysts is by burning off the coke in an atmosphere of air. It is also well known that most of these clay-type catalytic materials undergo some form of deterioration effecting their catalytic ability when subjected to temperatures greatly in excess of about 1000° F., the usual upper temperature limit being about 1100–1150° F. as read by thermocouples immersed in the burning catalyst mass.

It is also well known that there has recently been developed certain continuous methods for the conversion of hydrocarbons wherein a solid moving column of particle form contact mass material is continuously flowed through a reaction zone wherein it is contacted with hydrocarbon reactants in vapor form, then be removed and flowed continuously in somewhat similar fashion through a regenerating zone where coke deposited during the hydrocarbon conversion is removed.

This invention has to do generally with methods for the regeneration of such particle form solid adsorptive materials and is particularly concerned with methods for the efficient control of such regenerations. It has as a principal object, the provision of a process of regeneration wherein the regeneration may be carried out in the form of a series of partial regenerations, in each of which a portion of the contaminant material is removed and in each of which a control adequate in character to prevent heat damage of the adsorptive material may be exerted.

This invention may be understood more readily by referring to the drawing attached hereto, the single figure of which shows in highly diagrammatic form, an apparatus wherein the invention may be practiced. In this drawing, 1 designates the shell of a regenerator having an inlet 2 and an outlet 3, through which particle form solid adsorptive material 4 is flowed in such quantities as to maintain solid moving beds of adsorptive material upon each of the several partitions 5, which partitions 5 divide the interior of the regenerator into a series of chambers or stages, namely, 6–11 inclusive. Of these chambers, as shown in the drawing, chambers 6 and 11 are indicated merely as purging chambers. In chamber 6, the incoming adsorbent is purged to remove from it vaporous hydrocarbon materials, the purging material usually being steam or flue gas, admitted through pipe 12 and distributed into the bed of adsorptive material by appropriate devices, such as distributor trough 13, the purging vapors being removed through pipe 14. Similarly, in chamber 11, an appropriate purging medium may be introduced through pipe 15 and distributor 16, purged materials being removed at 17. Each of the intermediate chambers, i. e., chambers 7–10 inclusive, provides for a single stage of regeneration and for each chamber there is provided a regenerative medium inlet pipe 18, proper distributors 19 and regeneration fume exit pipe 20. There is also provided in each chamber below the level at which the regeneration medium is introduced a cooling coil 21, through which an appropriate fluid heat exchange medium may be circulated in indirect heat transfer relationship with the adsorptive material. It will be realized that this physical setup provides a series of stages in each of which a partial regeneration is effected and in each of which, after such burning, the temperature of the adsorptive material is reduced. Throughout the whole of stages 7–10 inclusive, the temperature of the adsorptive material will be held above its ignition temperature and below the temperature level at which heat damage to the adsorptive material will be suffered. In other words, usually for clay-type materials, it will be held between a minimum of about 750°-800° F. and a maximum of about 1050°-1100° F. The particular purpose of this invention is to provide in connection with this basic operation, a more complete method of control of the degree of burning. As is well known, the burning operation is highly exothermic. As is also well known, in operations of this kind, the burning tends to have the aspect of what might be termed a "flame front." For example, considering a very simple chamber of the type of chamber 7, there will be a volume immediately above distributor troughs 19 wherein a most intensive combustion is occurring; this volume will be relatively short in its vertical dimension. The adsorptive material is relatively poor in heat conductive capacity and consequently there is within this "flame front" a very considerable chance for localized overheating of individual particles of adsorptive material, at least in some chambers, even though the amount of burning accomplished in one stage as a whole is not sufficient on the average to raise the whole of the adsorptive material passing therethrough to damaging temperature levels prior to contact of such adsorptive material with the cooling coils in the lower portion of the chamber. According to one phase of this present invention, this danger of damage to adsorptive particles through localized high temperatures at certain points in its burning is avoided by the expedient of flattening the peak of combustion and so spreading the "flame front" or area of intensive combustion throughout each regeneration stage that the possibility of local temperatures high enough to effect damage is completely avoided.

Referring again to the drawing, an oxygen-containing regenerative medium, usually air under pressure and frequently preheated, will be supplied through pipe 22 and manifold 23 to the several regenerative medium inlet pipes 18. The products of combustion removed from each stage are gathered by manifold 24 and discharged through pipe 25. However, a portion of this regeneration fume or flue gas will be removed from pipe 25 and under pressure created by compressor 26 will be passed into manifold 27 for distribution by pipes 28 into the several regenerative medium inlets 18. In this manner, while still supplying through each pipe 18 an amount of oxygen appropriate for the desired combustion in any one of zones 7-10 inclusive, the concentration of oxygen in the regenerative medium may be so adjusted as to control the intensity of the combustion in each of the several regeneration zones. It will be realized that in most cases, the specific concentration of oxygen in the regenerative medium will be different for each of the several zones in that as the adsorptive material progresses through the several zones, less and less readily combustible contaminant remains upon the adsorptive material. In other words, in the absence of any intensity control and while still burning off identical amounts of contaminant by weight in each of the zones 7-10 inclusive, the combustion in zone 7 may be far more intense than that occurring in zone 10. Under such circumstances there might be in zone 7 an extremely narrow "flame front" of quite high intensity, while in zone 10 combustion might occur rather uniformly throughout the whole of the adsorptive material and not be particularly intense at any point therein. By being able to selectively adjust the oxygen concentration, in each of the several burning zones, by selective recirculation of flue gases, the method of this invention is able to achieve a degree of control over the burning not heretofore achieved and is, in fact, able to achieve not only a more uniform burn per stage, but in many cases is able to achieve a greater net removal of contaminant per stage of burning without damage to the adsorptive material while still maintaining the temperature of the adsorptive material above a kindling temperature and below a damaging temperature than has been heretofore thought possible.

In general, throughout the active burning zones, it will be necessary to vary the amount of flue gases admitted to each burning zone, for purposes as above outlined, and as a matter of preferred operations, the amount admitted to each zone will decrease from zone to zone as the degree of regeneration attained increases.

In case kiln structures are utilized, which take advantage of more complicated structures to introduce reactants more or less uniformly to all portions of the contact mass in each stage, rather than all at the bottom of each stage as is here shown, the "flame front" phenomenon discussed above may be less striking, but the salient points of control which may be effected by this invention are still present.

Another feature of importance which may be obtained is the control of the first chambers or stages of regeneration. At this point there is a deposit highly combustible in nature, and relatively more rich in hydrogen than that present after some combustion has taken place. Some of this material may frequently be removed, if the contact material enters at high temperatures, by passing high temperature flue gases, with relatively little or no air through the first stage for a "dry distillation" effect.

At the last stages, the remaining "coke" will be a material needing relatively high oxygen content in regeneration medium to secure ignition and consequently lesser amounts of flue gases, or even no flue gas at all will be used here.

In other cases, where the contact mass material enters at relatively low temperatures, the first stage may be operated without flue gas recycle, and even without cooling, to permit raising the temperature quickly to effective burning temperatures, even though, in the next burning zones, the admission of flue gas is desirable for purposes of control as above outlined.

We claim:

1. In a process for regenerating a moving substantially compact column of particle form solid contact mass material contaminated by combustible carbonaceous deposit by burning of the deposit wherein the burning tends to occur in a narrow flame front along at least the intermediate portions of the column length the improvement which comprises the following steps: flowing the particle form solid material as a substantially compact, vertical, continuous column downwardly through a series of regeneration zones, each of said zones being in free solid flow communication with adjacent zones, supplying spent contact material to the uppermost zone at a temperature substantially below that desired for the regeneration, withdrawing regenerated contact material from the lowermost zone, independently introducing a regeneration gas to each of said zones to pass through the solid material therein, independently withdrawing gaseous regeneration products from each of said zones while substantially excluding its interflow between zones, causing the contact material temperature to rise quickly to an effective burning temperature in said uppermost zone and maintaining the solid material in each zone at a temperature suitable for combustion of said carbonaceous deposit but below a temperature which would cause heat damage to said solid material, effecting a spread of the burning flame front in zones lying intermediate the uppermost and lowermost zones substantially throughout said zones by recycling a controlled amount of gaseous products of regeneration only to said intermediate zones, the recycled gaseous products of regeneration being introduced to each of the intermediate zones independently of their introduction to the other of said intermediate zones, and said products of regeneration being introduced into each of said intermediate zones at a rate controlled independently of the rate of regeneration gas introduction thereinto.

2. In a process for the burning regeneration of a moving substantially compact column of particle form solid contact mass material contaminated by a combustible carbonaceous deposit wherein the burning tends to occur along intermediate portions of said column in a narrow area of intensive combustion the improvement which comprises the following steps: flowing the particle form solid material at a substantially compact, vertical, continuous column downwardly through a series of alternating regeneration zones and cooling zones, each of said zones being in free solid flow communication with adjacent zones, supplying contact material to the uppermost regeneration zone below an effective burning temperature, withdrawing regenerated contact material from the lowermost zone, independently introducing an oxygen containing gas to each of said regeneration zones to pass through the solid material therein, independently withdrawing gaseous regeneration products from each of said regeneration zones while substantially excluding the flow of gas from one regeneration zone through adjacent cooling zones, effecting a quick rise in the contact material temperature to an effective burning temperature in said uppermost regeneration zone, passing a suitable heat exchange fluid in indirect heat transfer relation with the flowing solid material in each of said cooling zones to substantially remove from the solid material the heat released by burning in the previous regeneration zone, recycling gaseous regeneration products only to regeneration zones lying only below the uppermost and above the lowermost regeneration zones at a rate controlled to spread the area of intensive combustion substantially throughout the length of each of said zones.

THOMAS P. SIMPSON.
CHARLES V. HORNBERG.

REFERENCES CITED

The following references are of record in the file of this patent:

UNITED STATES PATENTS

| Number | Name | Date |
|---|---|---|
| 2,199,838 | Tyson | May 7, 1940 |
| 2,248,196 | Plummer | July 8, 1941 |
| 2,273,076 | Voorhees | Feb. 17, 1942 |
| 2,290,580 | Degnen et al. | July 21, 1942 |
| 2,303,717 | Arveson | Dec. 1, 1942 |
| 2,307,895 | Nairnan et al. | Jan. 12, 1943 |
| 2,317,379 | Hemminger | Apr. 27, 1943 |
| 2,330,767 | Welty | Sept. 28, 1943 |
| 2,334,555 | Howard | Nov. 16, 1943 |
| 2,362,621 | Fahnestock | Nov. 14, 1944 |
| 2,367,281 | Johnson | Jan. 16, 1945 |
| 2,371,619 | Hartley | Mar. 20, 1945 |
| 2,409,596 | Simpson et al. | Oct. 15, 1946 |
| 2,417,275 | Thompson et al. | Mar. 11, 1947 |
| 2,419,245 | Arveson | Apr. 22, 1947 |

FOREIGN PATENTS

| Number | Country | Date |
|---|---|---|
| 544,063 | Great Britain | Mar. 25, 1942 |